Patented July 23, 1935

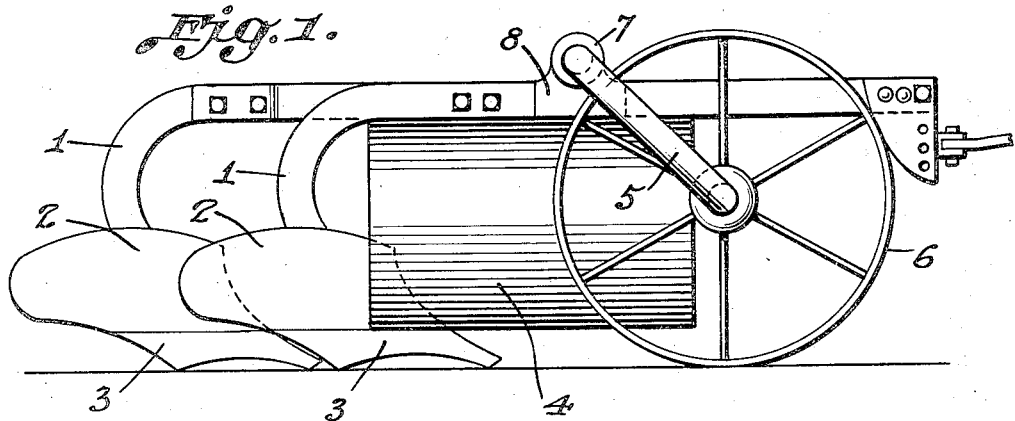
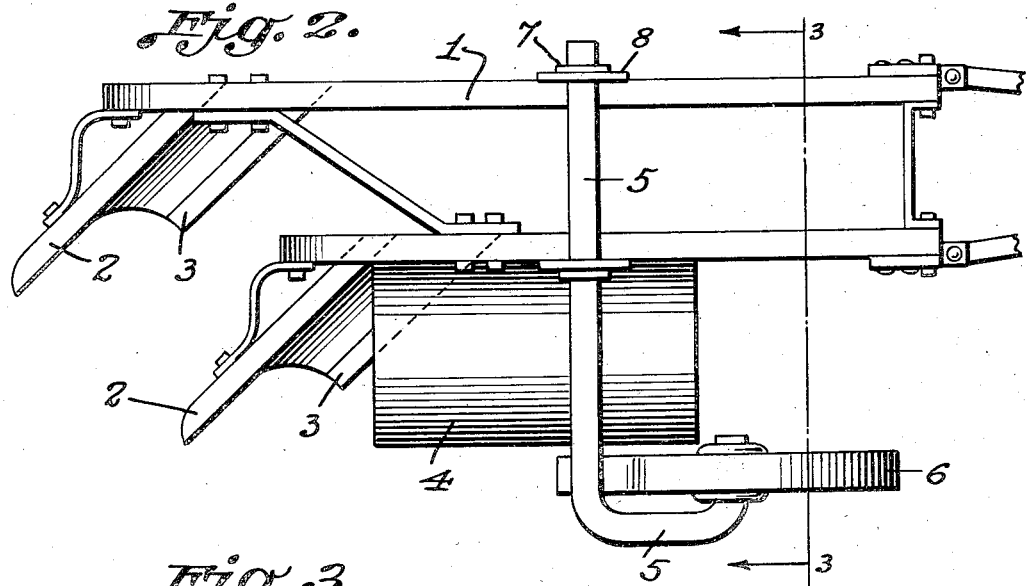
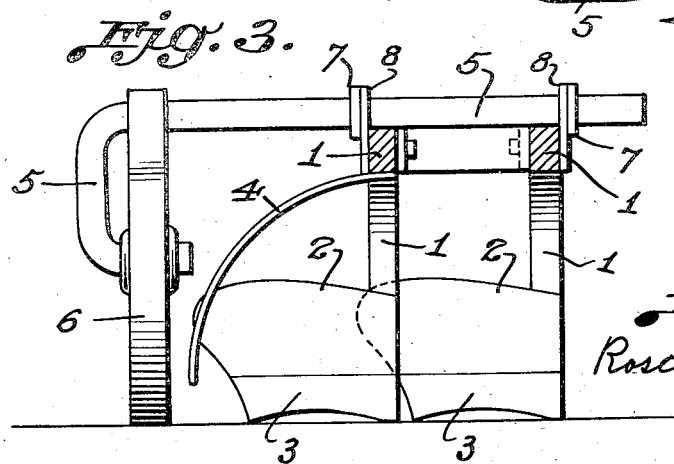

2,008,692

UNITED STATES PATENT OFFICE 2,008,692

PLOW

Roscoe M. Elmore, Crawfordsville, Ind.

Application August 30, 1933, Serial No. 687,461

1 Claim. (Cl. 97—103)

The chief object of this invention is to provide plows with a special front furrow wheel and axle so that the front furrow wheel may be placed in any position in the furrow from the land side of the furrow to the opposite or fallow side of said furrow to give room for litter to be placed in said furrow without being obstructed by said axle and wheel and to make room for a litter device to be placed between said wheel and the land side of said furrow and beneath said axle.

The main features of the invention are:

1. A front furrow axle that having passed through the frame of the plow passes beyond the furrow wheel and enters the furrow wheel from the side away from the frame of the plow.

2. A shield so placed in connection with said wheel and axle that litter thrown into the furrow will not come in contact with said wheel or be obstructed by said axle.

The full nature of the invention will be understood from the accompanying drawing and the following description and claim. Figure 1 is a side elevation of a multiple plow provided with the invention. Figure 2 is a plan view thereof. Figure 3 is a front elevation of a portion of the plow, some parts shown in section, the view being taken in the plane of line 3—3 of Figure 2 and facing in the direction of the arrows.

In the drawing 1 is a set of beams, 2 the mold portions and 3 the shares. 5 is the front furrow wheel axle placed at right angles to the beams by supports 8, and adjustable laterally to the beams by the collars 7.

Six is the front furrow wheel placed upon axle 5 and having 5 enter the wheel from the side away from the plow beams. The shield 4 is positioned in front of the mold board and share and between the furrow wheel and beam adjoining and in such manner that the axle 5 does not obstruct the passage of litter into the furrow, and wheel 6 does not come in contact with said litter.

This entire combination is designed to give a deep and complete coverage to litter plowed under in this manner.

The invention claimed is:

The combination in a plow having a frame of a shield and front furrow-wheel axle and wheel, said axle extending at right angles from said frame beyond said furrow wheel and entering said wheel from the fallow side thereof, said shield being placed beneath said axle and between said wheel and the land to be plowed and being substantially parallel to said plow frame whereby said shield will direct litter into the corresponding furrow free of said axle and wheel.

ROSCOE M. ELMORE.